(12) United States Patent
Yang et al.

(10) Patent No.: US 7,414,689 B2
(45) Date of Patent: Aug. 19, 2008

(54) CONTINUOUS DOMAIN IN-PLANE SWITCHING LIQUID CRYSTAL DISPLAY

(75) Inventors: Chiu-Lien Yang, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 402 days.

(21) Appl. No.: 11/086,223

(22) Filed: Mar. 21, 2005

(65) Prior Publication Data

US 2005/0206826 A1    Sep. 22, 2005

(30) Foreign Application Priority Data

Mar. 19, 2004    (TW) .............................. 93107402 A

(51) Int. Cl.
    G02F 1/1343    (2006.01)
(52) U.S. Cl. ..................................................... 349/141
(58) Field of Classification Search ................. 349/141, 349/143
    See application file for complete search history.

(56) References Cited

U.S. PATENT DOCUMENTS 6,459,465 B1 * 10/2002 Lee ........................... 349/141
2004/0207792 A1 * 10/2004 Wu ............................ 349/141
2005/0105033 A1 *  5/2005 Itou et al. ................... 349/141
2005/0140899 A1 *  6/2005 Ko ............................. 349/141
2005/0212999 A1 *  9/2005 Yang et al. .................. 349/113

* cited by examiner

Primary Examiner—David C. Nelms
Assistant Examiner—Thanh-Nhan P Nguyen
(74) Attorney, Agent, or Firm—Wei Te Chung

(57) ABSTRACT

An IPS liquid crystal display (200) of a preferred embodiment of the present invention includes a first substrate (201), a second substrate (202), and liquid crystal molecules interposed therebetween. A plurality of gate lines (211) and data lines (212) are formed at the first substrate, thereby defining a plurality of pixel regions. A pixel electrode (233), a common electrode (243) and a TFT (220) are provided in each pixel region, the pixel electrode and the common electrode having a same curved shape. Because the pixel and common electrodes of have a same curved shape with smooth bends, when a voltage is applied, disclination of the liquid crystal molecules does not occur, and the contrast ratio of the IPS LCD is unimpaired. Furthermore, the electric field generated by them is a smooth continuum of multiple domains, and the IPS LCD provides equally fine visual performance at various different viewing angles.

18 Claims, 5 Drawing Sheets

CONTINUOUS DOMAIN IN-PLANE SWITCHING LIQUID CRYSTAL DISPLAY

BACKGROUND OF THE INVENTION

1. Cross Reference to Related Application

This application is related to a co-pending application entitled "Continuous domain in-plane switch liquid crystal display," which is assigned to the same assignee as this application.

2. Field of the Invention

The present invention relates to IPS (in-plane switching) mode LCDs (liquid crystal displays), and particularly to an IPS LCD which provides continuous domains when in a driven state.

3. General Background

A liquid crystal display utilizes the optical and electrical anisotropy of liquid crystal molecules to produce an image. The liquid crystal molecules have a particular passive orientation when no voltage is applied thereto. However, in a driven state, the liquid crystal molecules change their orientation according to the strength and direction of the driving electric field. A polarization state of incident light changes when the light transmits through the liquid crystal molecules, due to the optical anisotropy of the liquid crystal molecules. The extent of the change depends on the orientation of the liquid crystal molecules. Thus, by properly controlling the driving electric field, an orientation of the liquid crystal molecules is changed and a desired image can be produced.

The first type of LCD developed was the TN (twisted nematic) mode LCD. Even though TN mode LCDs have been put into use in many applications, they have an inherent drawback that cannot be eliminated; namely, a very narrow viewing angle. By adding compensation films on TN mode LCDs, this problem can be ameliorated to some extent. However, the cost of the TN mode LCD is increased. Therefore, a totally different driving means called IPS (in-plane switching) was proposed as early as in 1974. Then in 1993, Hitachi Corporation filed its first U.S. patent application concerning IPS LCDs, in which a particular IPS mode LCD was disclosed.

A conventional IPS mode LCD has an upper substrate, a lower substrate, and a liquid crystal layer interposed therebetween. The liquid crystal layer has a plurality of liquid crystal molecules which have a same orientation when not driven, this orientation being parallel to the substrates. Pixel electrodes and common electrodes are disposed on the lower substrate. When a voltage is applied to the electrodes, an electric field is generated between the electrodes. The electric field drives the liquid crystal molecules to rotate, so that they have a new orientation that is still parallel to the substrates. The change in orientation results in a change in light transmission. In other words, the operation of the IPS mode LCD is such that the liquid crystal molecules rotate in a plane parallel with the substrates in order to fulfill optical switching. The displayed image has the important advantage of a wide viewing angle. In basic IPS mode LCDs, the pixel electrodes and common electrodes are each comb-shaped. The electric field of these LCDs in a driven state is along a certain direction. When the displayed image is viewed at different oblique angles, an observer can notice a quite large color shift.

Referring to FIG. 5, this is a top cross-sectional view of a pixel area of an IPS liquid crystal display as disclosed in U.S. Pat. No. 6,459,465 issued on Oct. 1, 2002. The pixel area includes a gate line 113 arranged in a first direction, a data line 115 and a common line 135 both arranged in a second direction orthogonal to the first direction, a pixel electrode 131, a common electrode 133, and a TFT (thin film transistor) 120 positioned at an intersection of the data line 115 and the gate line 113. The TFT 120 has a gate electrode 121, a source electrode 123 and a drain electrode 125, which are connected with the gate line 113, the data line 115 and the pixel electrode 131 respectively. The pixel electrode 131 and the common electrode 133 are spaced apart from each other. The pixel and common electrodes 131, 133 are each generally comb-shaped, with the teeth thereof being zigzagged. First portions of the teeth of the pixel and common electrodes 131, 133 that are aligned in a first direction and are parallel to each other form a first sub-electrode group. Second portions of the teeth of the pixel and common electrodes 131, 133 that are aligned in a second direction and are parallel to each other form a second sub-electrode group.

When a voltage is applied, because the pixel and common electrodes 131, 133 have the zigzagged structures, the electric field (not shown) generated is mainly along two directions. Referring to FIG. 6, the upper portion thereof shows part of the first sub-electrode group, and the lower portion thereof shows part of the second sub-electrode group. The liquid crystal molecules 130 in the upper and lower portions have different orientations, and the LCD exhibits a two-domain display effect. When viewing the LCD display from any oblique angle, the color shifts generated by the two domains counteract each other, and thus the overall color shift of the display is small.

However, the two-domain electrode configuration of the LCD inherently limits the display thereof. Equally good visual performance at various different viewing angles cannot generally be attained.

What is needed is a multi-domain IPS liquid crystal display which has a high contrast ratio and improved wide viewing angle characteristics.

SUMMARY

In one embodiment, an IPS liquid crystal display includes a first substrate, a second substrate, and liquid crystal molecules interposed therebetween. The first substrate has an alignment layer positioned at an inner surface thereof, the alignment layer having a first aligning direction and a second aligning direction. A plurality of gate lines and data lines are formed at the first substrate, thereby defining a plurality of pixel regions. A pixel electrode, a common electrode and a TFT are provided in each pixel region, the pixel electrode and the common electrode having a same curved shape.

Because the pixel and common electrodes of have a same curved shape with smooth bends, when a voltage is applied, disclination of the liquid crystal molecules does not occur, and the contrast ratio of the IPS LCD is unimpaired. Furthermore, the electric field generated by them is a smooth continuum of multiple domains, and the IPS LCD provides equally fine visual performance at various different viewing angles.

Other objects, advantages, and novel features of embodiments of the present invention will become more apparent from the following detailed description when taken in conjunction with the accompanying drawings, in which:

DETAILED DESCRIPTION OF PREFERRED EMBODIMENTS

Figure 1:
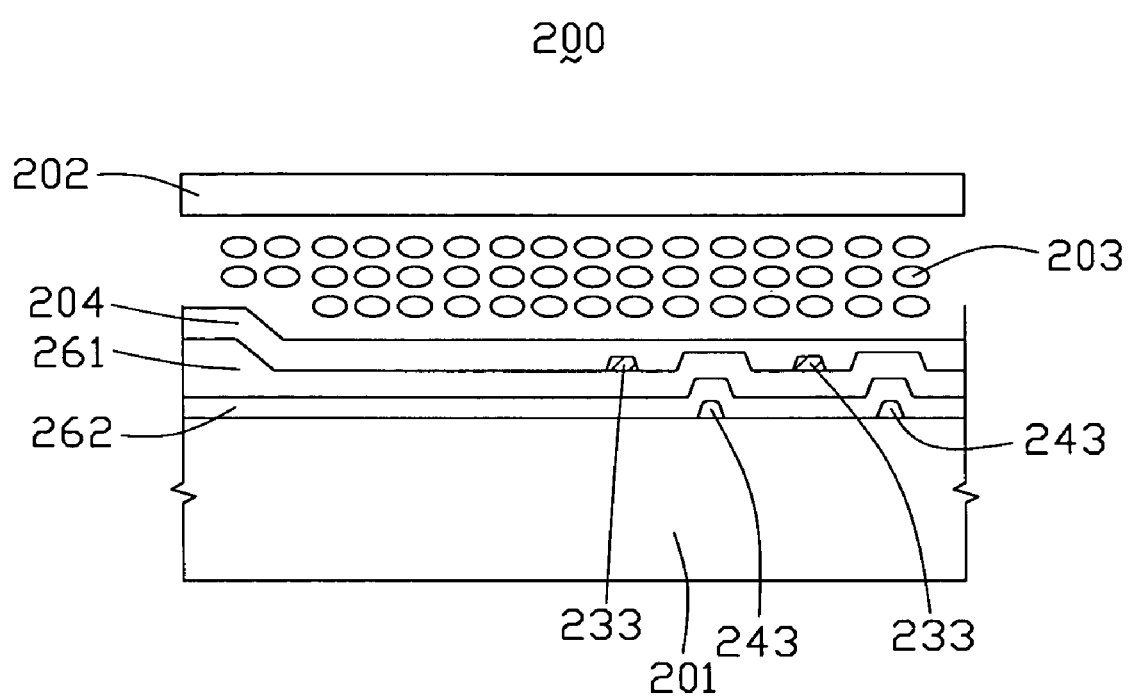
FIG. 1 is a schematic, side cross-sectional view of a pixel region of an IPS LCD according to a first embodiment of the present invention.
Figure 2:
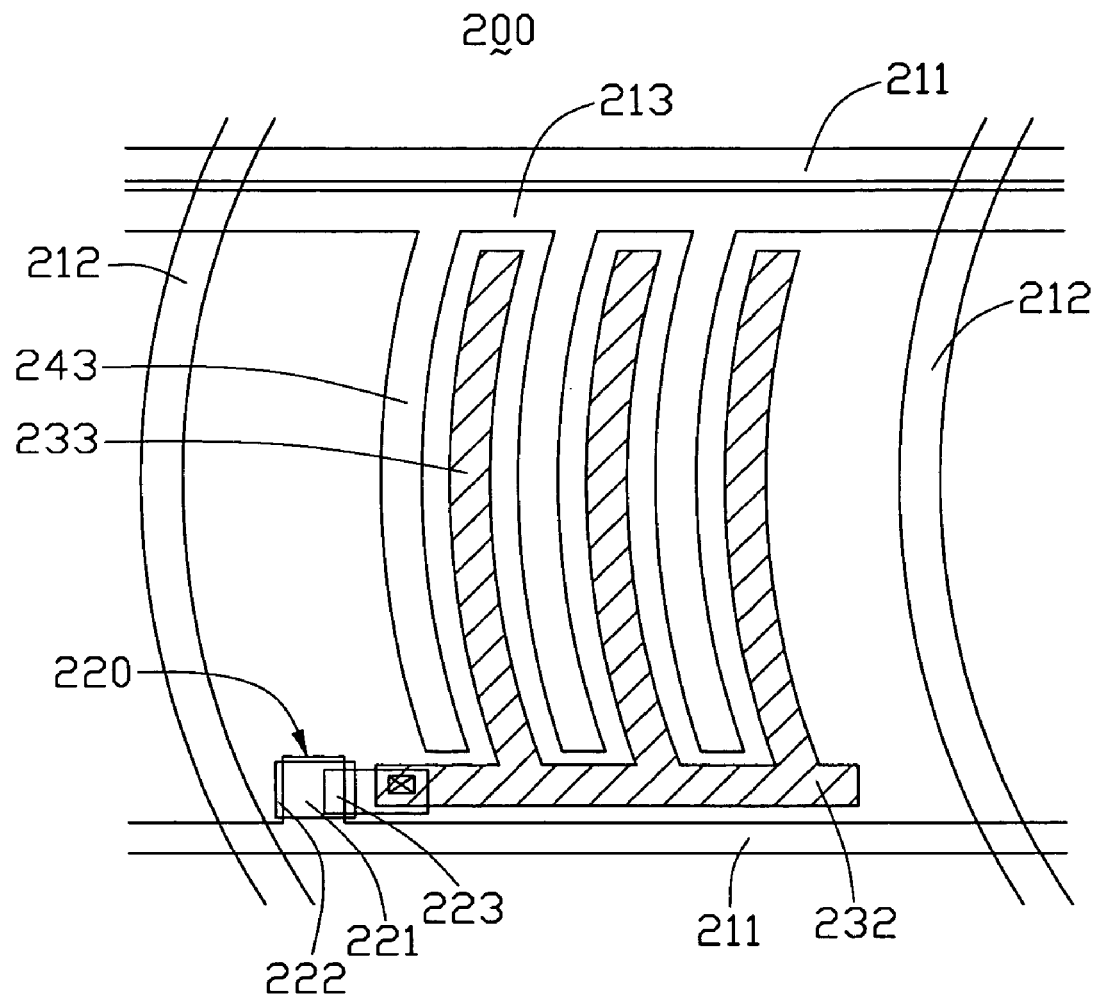
FIG. 2 is an enlarged, schematic top elevation of parts of the pixel region shown in FIG. 1.

Referring to FIG. 1 and FIG. 2, an in-plane switching liquid crystal display (IPS LCD) 200 according to a first embodiment of the present invention includes a first substrate 201, a second substrate 202 opposite and parallel to the first substrate 201, and liquid crystal molecules 203 interposed between the first and second substrates 201, 202. An insulation layer 262 and a plurality of common electrodes 243 are disposed on an inner surface of the second substrate 201, with the insulation layer 262 covering the common electrodes 243. A passivation layer 261, a plurality of pixel electrodes 233, and an alignment layer 204 are positioned on an inner surface of the insulation layer 262 in that order from bottom to top, with the alignment layer 204 covering the pixel electrodes 233. Referring to FIG. 2, a plurality of gate lines 211 are formed on the first substrate 201, and a plurality of data lines 212 are disposed on the insulation layer 262.

Figure 3:
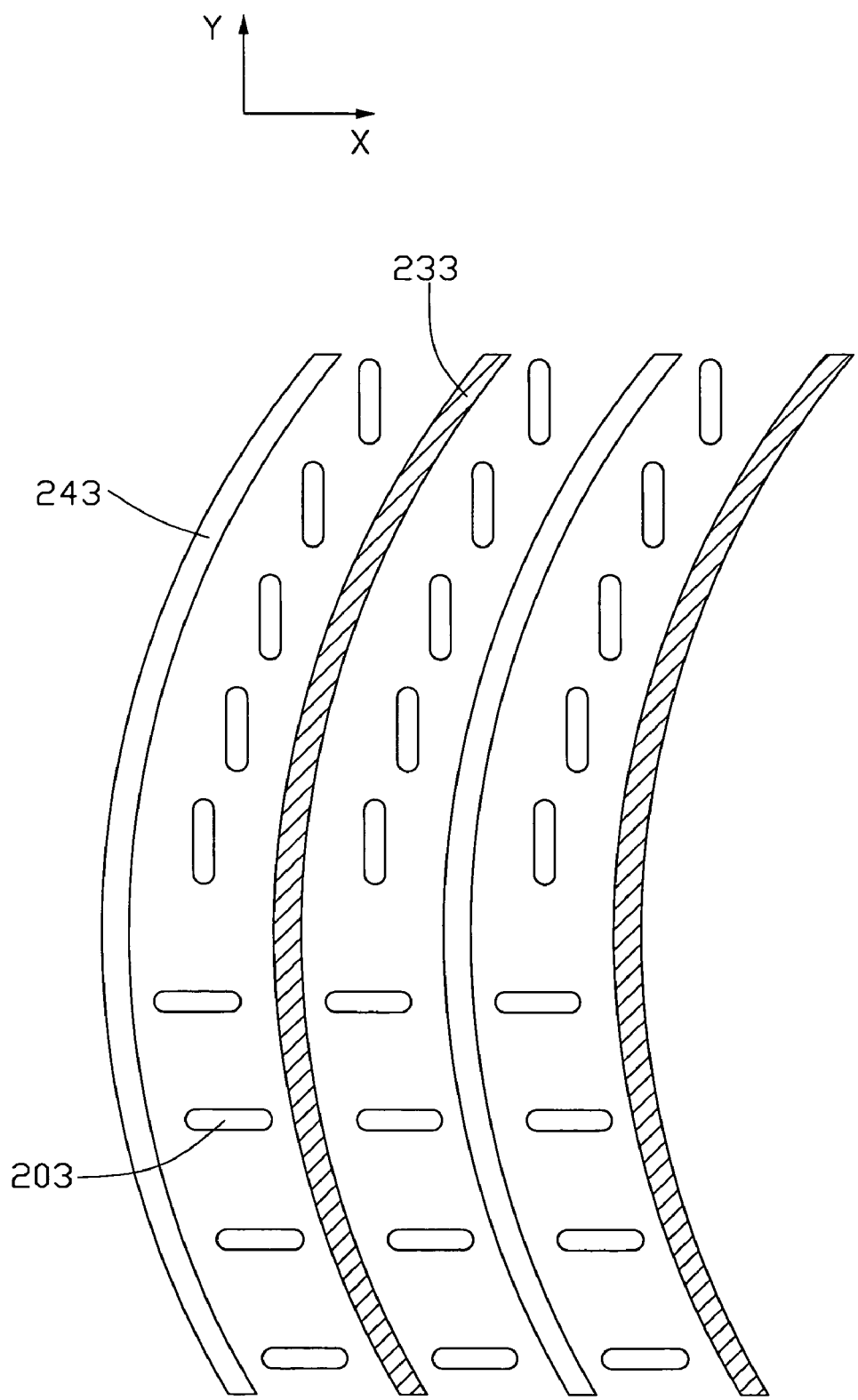
FIG. 3 is an enlarged view of parts of pixel and common electrodes of the parts of the pixel region shown in FIG. 2, showing approximate orientations of liquid crystal molecules between the parts of the pixel and common electrodes when the IPS LCD is in a driven state.

The alignment layer 204 has a first aligning direction and a second aligning direction (shown in FIG. 3) that are mutually perpendicular. The two aligning directions are created by one or more rubbing processes. A potential difference between each pair of the common electrodes 243 and pixel electrodes 233 defines an electric field that is substantially parallel to the first and second substrates 201, 202. The electric field twists liquid crystal molecules 203, so as to change an optical transmission ratio of the IPS LCD 200. Consequently, images are displayed by the IPS LCD 200 according to image signals received by the pixel electrodes 233.

The gate lines 211 and data lines 212 define a plurality of pixel regions arranged in a matrix. Each pixel region includes the common electrodes 243 and the pixel electrodes 233 that are disposed on the different layers of the IPS LCD 200, a common line 213, and a TFT (thin film transistor) 220. The TFT 220 has a gate electrode 221 connected to a gate line 211, a source electrode 222 connected to a data line 212, and a drain electrode 223 connected to the pixel electrodes 233 through a pixel line 232. The common line 213 is connected to the common electrodes 243. The pixel and common electrodes 233, 243 are each generally comb-shaped. The teeth of the pixel and common electrodes 233, 243 are arcuate, and are spaced a uniform distance apart from each other. That is, major portions of the teeth of the pixel and common electrodes 233, 243 are opposite and parallel to each other. Also referring to FIG. 3, this shows the structure of the pixel electrodes 233 and the common electrodes 243 and the approximate orientation of liquid crystal molecules 203 when the IPS LCD 200 is in a driven state. Because the pixel and common electrodes 233, 243 have the arcuate shape, the electric field generated by them is a smooth continuum of multiple domains, and the IPS LCD 200 provides equally fine visual performance at various different viewing angles. The pixel electrodes 233 and the common electrodes 243 can be made of a metallic material or a transparent conductive material such as ITO (indium tin oxide). The IPS LCD 200 has a higher aperture ratio if the electrodes 233, 243 are transparent.

Figure 4:
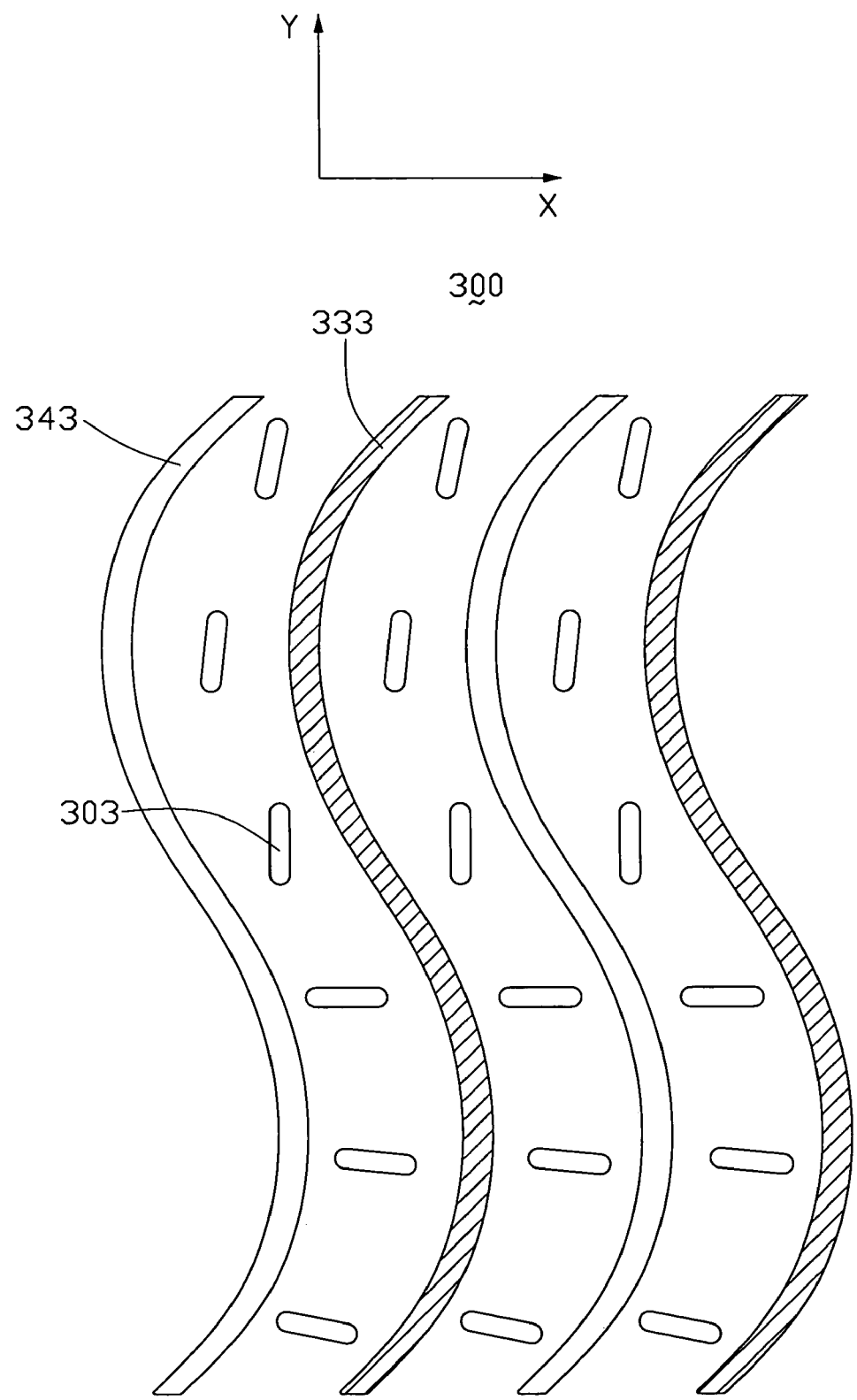
FIG. 4 is similar to FIG. 3, but showing parts of pixel and common electrodes of parts of a pixel region of an IPS LCD according to a second embodiment of the present invention.
Figure 5:
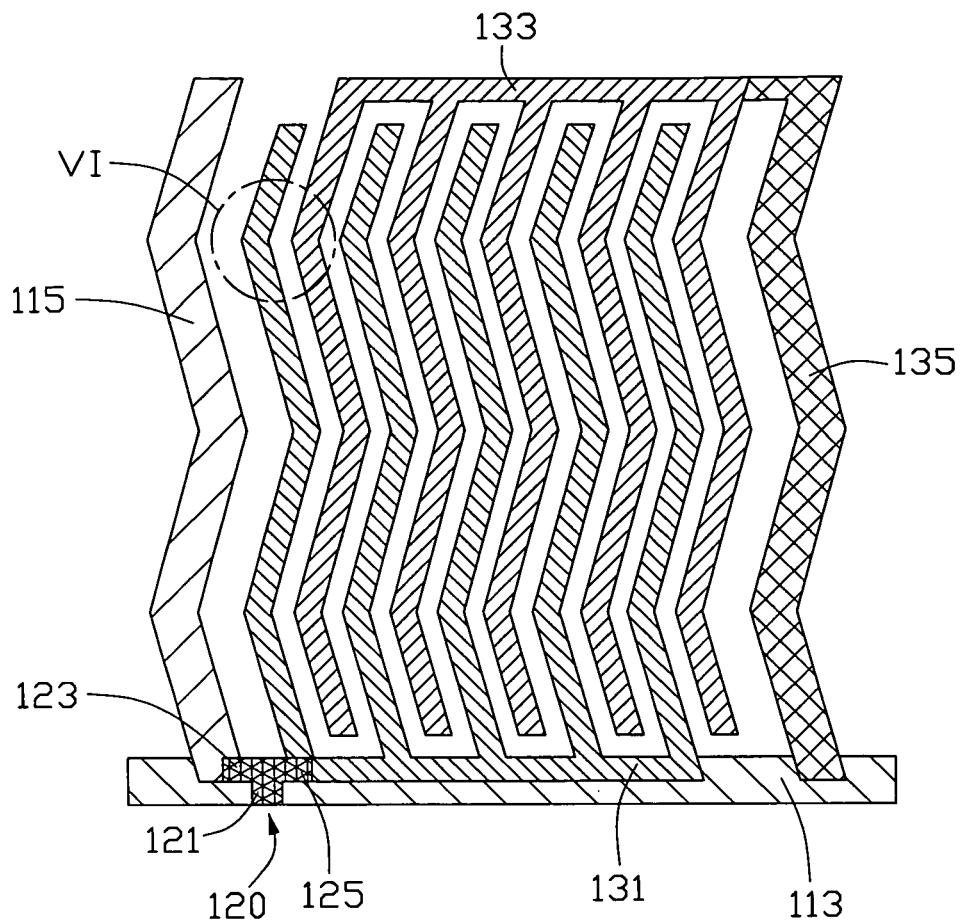
FIG. 5 is a top cross-sectional view of parts of a pixel region of a conventional IPS LCD.
Figure 6:
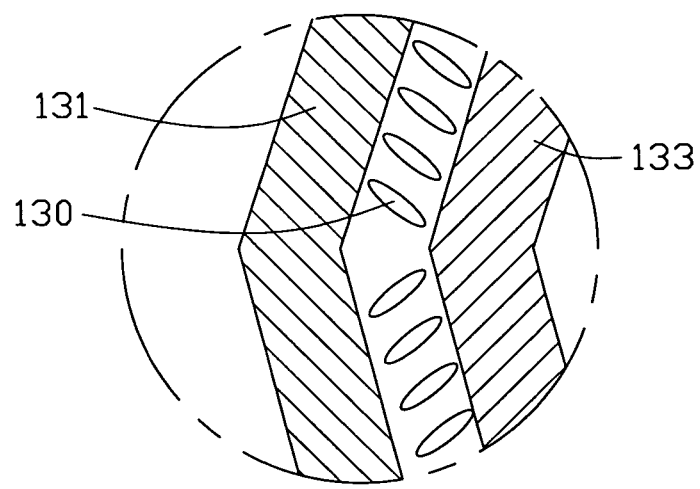
FIG. 6 is essentially an enlarged view of a circled portion VI of FIG. 5.

Referring to FIG. 4, an IPS LCD 300 according to the second embodiment of the present invention is similar to the IPS LCD 200 of the first embodiment. However, the IPS LCD 300 includes pixel electrodes 333 and common electrodes 343 whose teeth have a same wavy shape. That is, the pixel and common electrodes 333, 343 are each generally comb-shaped, with the wavy-shaped teeth thereof being spaced a uniform distance apart from each other. Major portions of the teeth of the pixel and common electrodes 333, 343 are opposite and parallel to each other. Liquid crystal molecules 303 of the IPS LCD 300 are divided into a first group and a second group. Aligning directions of the first group of the liquid crystal molecules 303 are changed according to directions of the electrodes 333, 343. Aligning directions of the second group of liquid crystal molecules 303 are also changed according to the directions of the electrodes 333, 343, and are perpendicular to the aligning directions of the first group of liquid crystal molecules 303. Because the pixel and common electrodes 333, 343 have the wavy shape, the electric field generated by them is a smooth continuum of multiple domains, and the IPS LCD 300 provides equally fine visual performance at various different viewing angles.

According to the above-described embodiments, the pixel and common electrodes have a same curved shape with smooth bends. Therefore when a voltage is applied, disclination of the liquid ceystal molecules does not occur, and the contrast radio of the IPS LCD is unimpaired. Further, the electric field generated is a smooth continuum of multiple domains. Therefore the IPS LCD 200, 300 provides equally fine visual performance at various different viewing angles.

In alternative embodiments, the pixel electrodes 233, 333 and common electrodes 243, 343 may be formed on a same layer of the IPS LCD 200, 300, by utilizing contact holes or other suitable means. This enables a true in-plane electric field to be generated, with the efficiency of utilization of the electric field being higher.

The present invention may have further alternative embodiments, including wherein the two aligning directions are created by one or more photo alignment processes or by one or more ion beam alignment processes.

It is to be further understood that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:
1. A liquid crystal display, comprising:
 a first substrate having an alignment layer positioned at an inner surface thereof, the alignment layer having a first aligning direction and a second aligning direction;
 a second substrate;
 liquid crystal molecules interposed between the first and second substrates;
 a plurality of gate lines and data lines formed at the first substrate, thereby defining a plurality of pixel regions; and a pixel electrode, a common electrode and a TFT (thin film transistor) provided in each pixel region, the pixel electrode and the common electrode having a same curved shape.

2. The liquid crystal display as claimed in claim 1, wherein the first and second aligning directions are mutually perpendicular.

3. The liquid crystal display as claimed in claim 1, wherein the pixel electrode and the common electrode are each generally comb-shaped, and are spaced a uniform distance apart from each others.

4. The liquid crystal display as claimed in claim 1, wherein the pixel electrode and the common electrode have a same wavy shape.

5. The liquid crystal display as claimed in claim 1, wherein the pixel electrode and the common electrode have a same arcuate shape.

6. The liquid crystal display as claimed in claim 1, wherein the pixel electrode and the common electrode are located at a same level of the first substrate.

7. The liquid crystal display as claimed in claim 1, wherein the pixel electrode and the common electrode are located at different levels of the first substrate.

8. The liquid crystal display as claimed in claim 1, wherein the pixel electrode and the common electrode are made of metallic material.

9. The liquid crystal display as claimed in claim 1, wherein the pixel electrode and the common electrode are made of transparent conductive material.

10. The liquid crystal display as claimed in claim 9, wherein the pixel electrode and the common electrode are made of indium tin oxide.

11. A liquid crystal display, comprising:
a first substrate having an alignment layer positioned at an inner surface thereof, the alignment layer having a first aligning direction and a second aligning direction;
a second substrate;
liquid crystal molecules interposed between the first and second substrates;
a plurality of gate lines and data lines formed at the first substrate, thereby defining a plurality of pixel regions; and
a pixel electrode, a common electrode and a TFT (thin film transistor) provided in each pixel region, the pixel electrode and the common electrode having a same wavy shape;
wherein when the liquid crystal display is in a drive state, the first aligning direction of the alignment layer is changed according to the wavy shape of the electrodes, and the second aligning direction of the alignment layer is changed according to the wavy shape of the electrodes, the second aligning direction being perpendicular to the first aligning direction.

12. The liquid crystal display as claimed in claim 11, wherein the pixel electrode and the common electrode are each generally comb-shaped, and are spaced a uniform distance apart from each other.

13. The liquid crystal display as claimed in claim 11, wherein the pixel electrode and the common electrode are located at a same level of the first substrate.

14. The liquid crystal display as claimed in claim 11, wherein the pixel electrode and the common electrode are located at different levels of the first substrate.

15. The liquid crystal display as claimed in claim 11, wherein the pixel electrode and the common electrode are made of metallic material.

16. The liquid crystal display as claimed in claim 11, wherein the pixel electrode and the common electrode are made of transparent conductive material.

17. The liquid crystal display as claimed in claim 16, wherein the pixel electrode and the common electrode are made of indium tin oxide.

18. A liquid crystal display comprising:
a pixel matrix substrate comprising a plurality of pixel regions, each pixel region comprising a pixel electrode and a common electrode in essentially a same wavy shape, an electric field generated between adjacent pixel and common electrodes having a plurality of directions, wherein a plurality of liquid crystal molecules located between every neighboring pixel and common electrodes, are arranged in at least first and second groups corresponding to two different alignment directions perpendicular to each other.

* * * * *